April 21, 1953  R. SHUTTER  2,635,892
RESILIENT BALL AND SOCKET TYPE DRAFT MEANS
Filed Feb. 1, 1952  2 SHEETS—SHEET 1
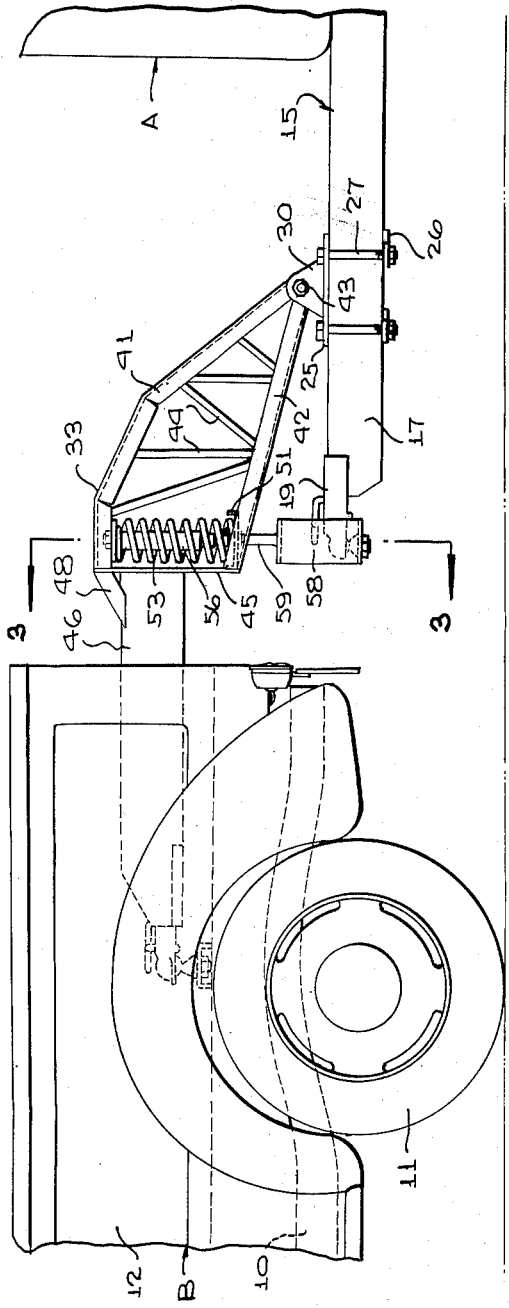
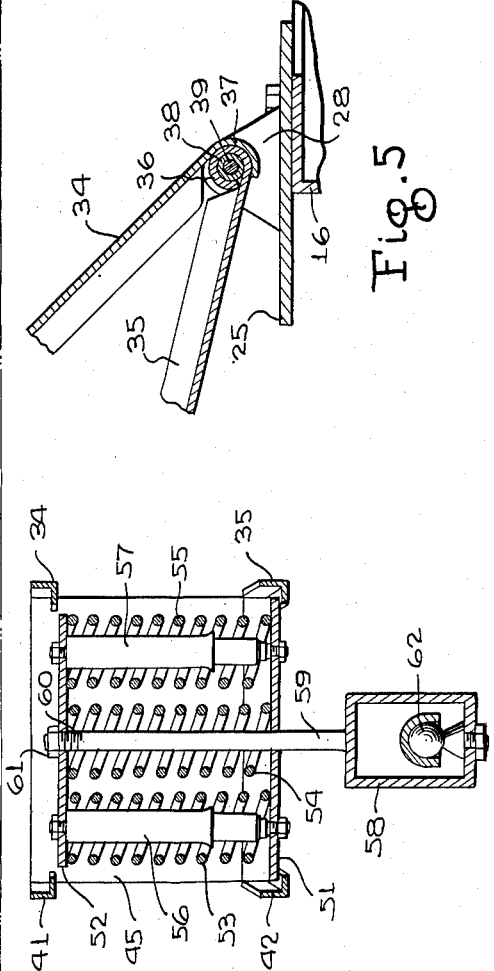
INVENTOR.
RUSSELL SHUTTER
BY
McMorrow, Berman + Davidson
ATTORNEYS April 21, 1953 R. SHUTTER 2,635,892
RESILIENT BALL AND SOCKET TYPE DRAFT MEANS
Filed Feb. 1, 1952 2 SHEETS—SHEET 2

INVENTOR.
RUSSELL SHUTTER
BY
McMorrow, Berman + Davidson
ATTORNEYS

Patented Apr. 21, 1953

2,635,892

UNITED STATES PATENT OFFICE 2,635,892

RESILIENT BALL AND SOCKET TYPE DRAFT MEANS

Russell Shutter, Benton, Ark.

Application February 1, 1952, Serial No. 269,405

1 Claim. (Cl. 280—33.44)

This invention relates to trailer hitches and more particularly to a trailer hitch adapted to connect a trailer tongue to a towing post mounted in the trunk compartment of a towing automobile or in the body of a towing truck.

It is among the objects of the invention to provide an improved trailer hitch which connects the tongue of a trailer to a towing post mounted in the trunk or body of and over the rear axle of a towing vehicle, so that the loading on the front axle of the towing vehicle is not materially affected by the weight and drag of the trailer; which is particularly adapted for connecting two wheeled or semitrailers to towing vehicles and permit free turning of corresponding towing and trailing vehicles relative to each other and damped, resiliently resisted vertical movement of the front end of a trailer relative to an associated towing vehicle or tractor; which supports the tongue of the trailer at a location below the bottom of the trunk compartment or body of a towing vehicle and is adjustable to compensate for variation in the levels of the bottom portions of towing vehicles to which the hitch is connected; which provides a high factor of safety; and which is simple and durable in construction, economical to manufacture, easy to install, and positive and effective in operation.

Other objects and advantages will become apparent from a consideration of the following description and the appended claim in conjunction with the accompanying drawings wherein:

Figure 1 is a fragmentary side elevational view of a towing vehicle and associated trailer with a trailer hitch illustrative of the invention connecting the trailer to the towing vehicle.

Figure 3 is a transverse cross sectional view on the line 3—3 of Figure 1;

Figure 5 is a fragmentary cross sectional view on the line 5—5 of Figure 2.

Figure 2:
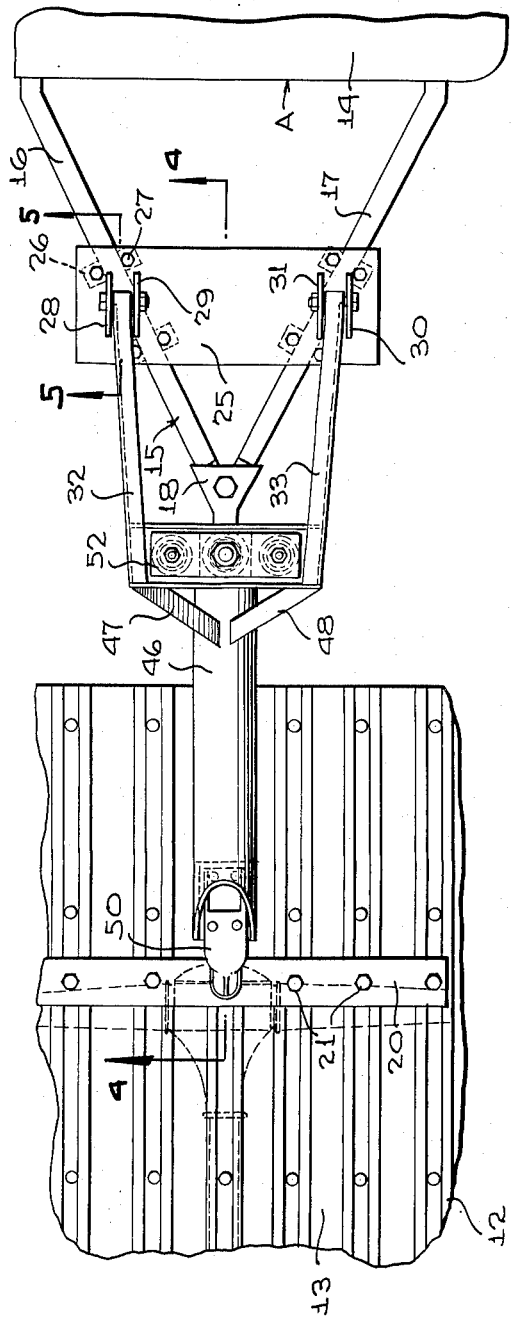
Figure 2 is a top plan view of the assembly illustrated in Figure 1.

With continued reference to the drawings, the trailer is generally designated at A and the towing vehicle, illustrated as a light truck, is generally designated at B. The truck has a chassis frame 10 supported at its rear end on a rear axle having rear wheels 11 mounted one on each end thereof and carries a body 12 provided with a floor 13.

The trailer has a body 14 supported near its rear end on suitable road wheels, not illustrated, and having a tongue, generally indicated at 15, projecting forwardly from its front end.

The tongue 15 comprises channel bars 16 and 17 secured at their rear ends to the trailer body near the front end of the latter and one at each side of the longitudinal center line of the trailer body and converging symmetrically toward the longitudinal center line of the trailer body as they extend forwardly therefrom. A triangular gusset plate 18 is secured on the upper sides of the tongue bars 16 and 17 at the front ends of these bars and rigidly secured thereto by suitable means, such as welding, and a coupling socket, generally indicated at 19 and of known construction, is secured to the plate 18 and extends forwardly of the front ends of the bars 16 and 17.

The construction so far described is well known and constitutes no part of the present invention, except in the combination thereof with the novel structure of the hitch presently to be described.

A brace bar 20 of channel shaped cross section extends transversely of the body floor 13 immediately above the rear axle of the towing vehicle and is secured to the floor 13 with its web portion spaced from the floor by suitable bolts 21 extending through apertures in the web portion of the brace bar and through registering apertures in the floor of the towing vehicle.

A towing post 22 extends through registering apertures in the web portion of the brace bar 20 and in the floor 13 of the towing vehicle substantially at the mid-length location of the brace bar and carries a ball coupling formation 23 above the web portion of the brace bar.

A plate 25 of rectangular shape is secured on the tongue bars 16 and 17 at a location spaced rearwardly from the plate 18 by suitable means, such as the U-shaped clips 26 surrounding the tongue bars and bolts 27 extending through registering apertures in the clips and the plate 25.

A pair of apertured lugs 28 and 29 project upwardly from the plate 25 over the tongue bar 16 in spaced apart and substantially parallel relationship to each other and a similar pair of apertured lugs 30 and 31 project upwardly from the plate 25 over the tongue bar 17. A truss frame 32 has one end disposed between the lugs 28 and 29 and a complementary truss frame 33 spaced from and substantially parallel to the frame 32 has one end disposed between the lugs 30 and 31.

Figure 4:
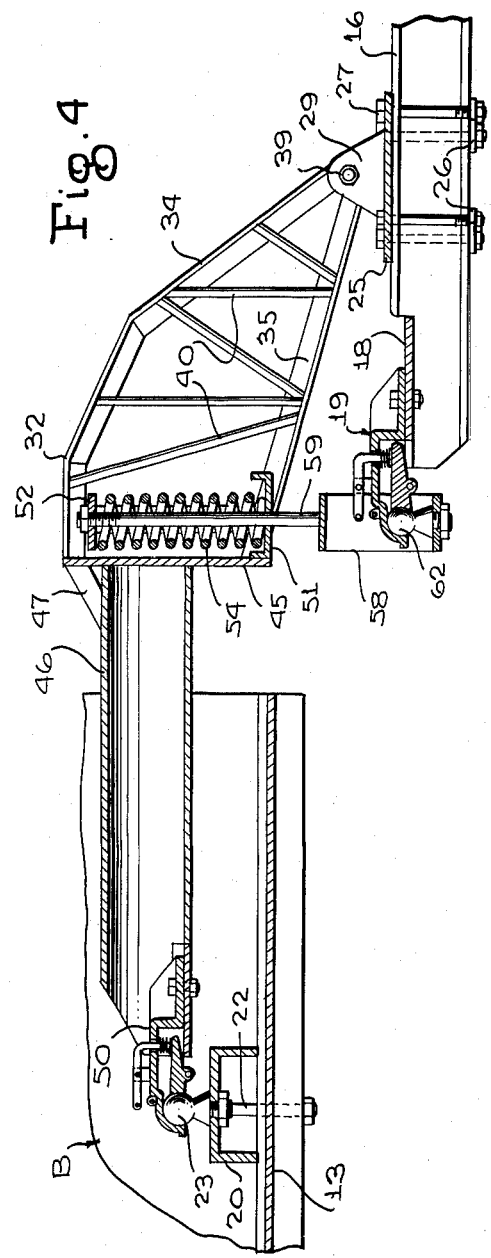
Figure 4 is a longitudinal cross sectional view on the line 4—4 of Figure 2.

The frame 32, as is particularly illustrated in Figure 4, comprises a longitudinally curved top rail 34, preferably formed of angle iron, and a straight bottom rail 35 brought together at the rear end of the frame and curved at their rear ends to provide a substantially cylindrical formation 36 on the bottom rail 35 and a partly cylindrical formation 37 on the top rail 34 receiving the formation 36. The formations 36 and 37 are rigidly secured together and receive a cylindrical bushing 38 and a bolt 39 extends through the bushing 38 and through registering apertures in the lugs 28 and 29 to pivotally connect the frame 32 at its rear end to the plate 25. The top and bottom rails 34 and 35 diverge in a direction away from the bushing 38 and are held in spaced apart relationship by struts or braces 40 extending therebetween.

The frame 33 comprises a longitudinally curved top rail 41 and a substantially straight bottom rail 42, the top and bottom rails being provided at the rear end of the frame with cylindrical formations receiving a bushing similar to the bushing 38 and connecting the rails together at the rear end of the frame. A bolt 43 extends through the bushing carried by the rails 41 and 42 and through registering apertures in the lugs 30 and 31 to pivotally connect the frame 33 at its rear end to the plate 25. The pivotal connections between the frames 32 and 33 and the plate 25 have a common axis which is disposed substantially parallel to the upper surface of the plate 25 and perpendicular to the longitudinal center line of the trailer vehicle A, this axis being normally substantially horizontally disposed under operating conditions.

The top and bottom rails 41 and 42 of the frame 33 diverge in a direction away from the corresponding bushing and are held in spaced apart relationship by struts or braces 44 and a plate 45 of rectangular shape is secured at its corners to the top and bottom rails of the frames 32 and 33 and is normally substantially vertically disposed and substantially parallel to the axis of the pivotal connections between the frames 32 and 33 and the plate 25.

A beam 46 in the form of a tubular member is rigidly secured at one end to the plate 45 at the side of this plate remote from the frames 32 and 33 and extends substantially perpendicularly from the plate, the frames 32 and 33 and the beam 46 extending forwardly from the pivotal connections between the frames and the tongue 15 of the trailer.

Diagonal braces 47 and 48 extend between the upper corners respectively, of the plate 45 and the beam 46 at a location spaced forwardly from the plate to reinforce the connection between the beam 46 and the plate 45 and the beam 46 carries a coupling socket 50, of known construction, at its end remote from the plate 45.

The socket 50 receives the ball formation on the towing post 22 to connect the beam 46 to the coupling post and through the coupling post to the towing vehicle when the trailer is coupled to the tractor.

A spring abutment 51 in the form of a channel member having upwardly projecting flanges is secured to the plate 45 and extends along the bottom edge of this plate and projects substantially perpendicularly therefrom in a rearward direction. A second spring abutment 52, in the form of a plate of rectangular shape, is disposed above and substantially parallel to the abutment 51.

Coiled compression springs 53, 54 and 55 are disposed between the lower and upper spring abutments 51 and 52 in spaced apart and substantially parallel relationship to each other with the spring 54 substantially centered relative to the mid-length location of the abutments and springs 53 and 55 disposed one at each of two opposite sides of the spring 54. Shock absorbers or dampeners 56 and 57 are connected at their opposite ends to the abutments 51 and 52 and extend through the springs 53 and 55 respectively, to control the spring induced movements of the upper abutment 52 relative to the lower abutment 51.

A bracket 58 in the form of a hollow housing of rectangular shape having open ends is disposed below the lower spring abutment 51 and a rod or shaft 59 extends through apertures in the spring abutments 51 and 52 substantially at the mid-length locations of these abutments and through the center spring 54. At its end extending through the abutment 52 the rod 59 is externally screw threaded, as indicated at 60, and a nut 61 is threaded onto this screw threaded end portion of the rod to provide an adjustable connection between the rod and the upper spring abutment 52. At its lower end the rod 59 is rigidly secured to the bracket 58 at the top of the bracket to suspend the bracket from the upper spring abutment.

A coupling ball formation 62 is mounted on the lower side of the bracket 58 and disposed within the bracket and this ball formation 62 is received in the coupling socket 19 mounted on the front end of the trailer tongue 15 to secure the bracket 58 to the front end of the trailer tongue.

With this arrangement, the beam 44 and frames 32 and 33 provide a draft connection between the towing post 22 mounted on the towing vehicle and the trailer tongue 15 through the pivotal connections between the frames 32 and 33 and the trailer tongue. These pivotal connections together with the spring suspended bracket 58 and the coupling between this bracket and the front end of the trailer tongue provide a resilient suspension for the trailer tongue which permits the trailer tongue to move up and down with spring resistance to its downward movement, the up and down movements of the tongue being damped by the shock absorbers 56 and 57.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In combination, a trailer tongue having a first ball hitch socket on its forward end, a first hitch ball adapted to be mounted on a tractor vehicle, a hitch assembly comprising a truss frame having rearward and forward ends, means pivoting the rearward end of said frame to said tongue at a point spaced rearwardly from said first hitch socket, the forward end of said frame reaching forwardly beyond said first hitch socket, a vertical plate fixed in the forward end of said frame, a first spring abutment fixed on and projecting rearwardly from said vertical plate, said first abutment being provided with a guide element, a vertical link engaging said guide element for vertical movement relative to said first abutment, said link extending above and below said first abutment, a second hitch ball on the lower end of said link with which said first socket is engaged, a second abutment on the upper end of said link and spaced above said first abutment, spring means compressed between said first and second abutments, a beam having a rearward end fixed to said vertical plate, and a forward end, and a second hitch ball socket on the forward end of said beam and engaging said second hitch ball.

RUSSELL SHUTTER.

References Cited in the file of this patent

UNITED STATES PATENTS

| Number | Name | Date |
|---|---|---|
| 2,212,081 | Spires | Aug. 20, 1940 |
| 2,459,965 | Robertson | Jan. 25, 1949 |
| 2,463,140 | Bihn | Mar. 1, 1949 |
| 2,474,296 | Wiltsee | June 28, 1949 |
| 2,523,211 | Hedgpeth | Sept. 19, 1950 |
| 2,531,289 | Murat | Nov. 21, 1950 |